Nov. 17, 1925.

W. O. WETMORE

VEHICLE TIRE

Filed Oct. 22, 1923

1,561,759

WITNESSES

Inventor
William O. Wetmore
By Richard B. Owen
Attorney

Patented Nov. 17, 1925.

1,561,759

UNITED STATES PATENT OFFICE.

WILLIAM O. WETMORE, OF DOUGLAS, ARIZONA.

VEHICLE TIRE.

Application filed October 22, 1923. Serial No. 670,196.

*To all whom it may concern:*

Be it known that I, WILLIAM O. WETMORE, a citizen of the United States, residing at Douglas, in the county of Cochise and State of Arizona, have invented certain new and useful Improvements in a Vehicle Tire, of which the following is a specification.

This invention appertains to tires for motor vehicles and the like and the primary object of the invention is to provide an improved means for forming tire casings, so as to effectively prevent the breaking of rubber fragments from off of the same and to insure the longevity thereof.

A further object of the invention is to provide an improved tire casing having wire mesh embedded therein for strengthening the tire and for preventing blowouts in the tire caused by a weakened tire casing or the over inflation of the inner tube disposed therein.

A further object of the invention is the provision of novel means for strengthening tires consisting of embedding spaced sheets of coarse wire mesh in the rubber from which the tire is made and connecting the spaced sheets of wire mesh together by radial extending wear members, the radially extending wear members terminating short of the beads of the tire at the side walls thereof to permit the easy flexing of said side walls, whereby a tire casing can be easily removed or placed on a vehicle rim.

Figure 1:
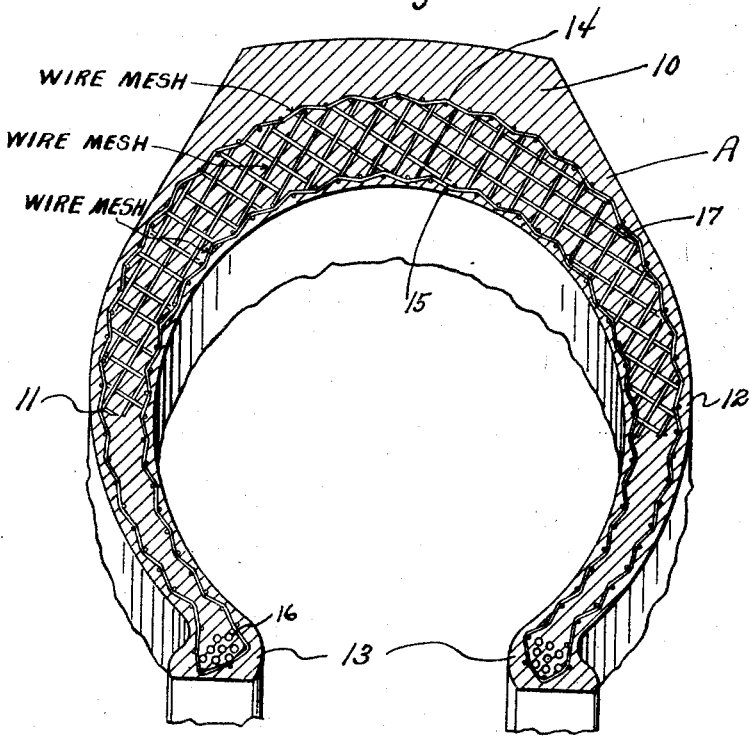
Figure 2:
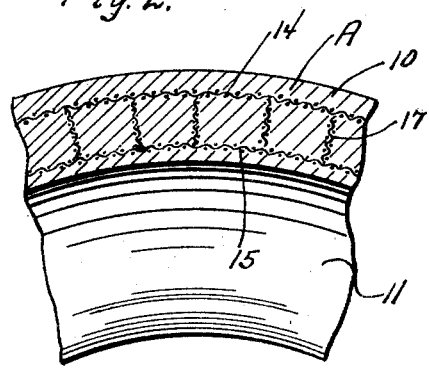

With these and other objects in view, the invention consists in the novel construction, arrangement and formation of parts, as will be hereinafter more specifically described, claimed and illustrated in the accompanying drawings, in which drawings:

Figure 1 is a transverse section through a tire casing constructed in accordance with this invention, Figure 2 is a fragmentary longitudinal section through a tire casing constructed in accordance with this invention.

Referring to the drawings in detail, wherein similar reference characters designate corresponding parts throughout the several views, the letter A generally indicates a tire casing of the ordinary configuration used on motor vehicles for receiving an inflatable inner tube, and this casing includes the tread 10, the side walls 11 and 12 and the beads 13 formed on the side walls to permit the retaining of the casing on a tire rim.

In accordance with this invention, inner and outer sheets 14 and 15 of heavy coarse wire mesh are imbedded in the casing A and extend around the tread 10 and the side walls 11 and 12 and terminate in the beads 13. By referring to Figure 1 of the drawings, it can be seen that the inner and outer sheets 14 and 15 are connected together at the beads 13 of the casing and the beads are further strengthened by suitable longitudinally extending wires or braided cables 16. These wires or braided cables 16 are disposed between the sheets of wire mesh 14 and 15.

These sheets 14 and 15 constitute wear members for the tire casing and effectively strengthen the same so as to prevent blowouts and the like, and it is obvious that as the rubber fills the interstices between the sheets of wire mesh 14 and 15, that the breaking off of the rubber in large pieces from the casing is absolutely precluded.

In order to further strengthen the casing and to add to the wearing qualities thereof, the sheets of wire mesh 14 and 15 are connected together by radially extending sections of wire mesh 17. These sections of wire mesh 17 not only add to the wearing qualities of the tire casing but also strengthen the same and prevent blowouts. It is to be noticed that the terminals of the sections 17 terminate in the side walls 11 and 12 of the casing in spaced relation to the beads 13, and this allows free flexing of the side walls, so as to permit manipulation of the beads 13 during the removing and placing of the tire casing on a tire rim. It is to be also noticed that the wires of sections of wire mesh 17 extend at an angle to the plane of the tire casing which disposes a greater number of the wires constituting the section 17 at the tread and at the side walls.

In forming the tire, the same is constructed of superimposed layers and as the tire is built up, the wire mesh is put in between the alternate layers one at a time, and the two layers of wire mesh are connected together at their lower ends and the whole tire is vulcanized together.

From the foregoing description, it can be seen that I have provided novel means for constructing tires for motor vehicles and the like in which the tire is effectively strengthened and prevented from having large sections thereof knocked off.

Changes in details may be made providing the same do not depart from the spirit or scope of this invention, as defined by the claim.

What I claim as new is:

In a vehicle tire, a casing including a tread, side walls and beads formed on the side walls, inner and outer sheets of wire fabric embedded in the side walls and tread of the casing, the inner and outer sheets of fabric extending into the beads and connected together in said beads, longitudinally extending wire cables disposed in the beads between the inner and outer sheets of wire fabric, and sections of wire fabric disposed transversely of the casing connecting the inner and outer sheets of wire fabric together, the sections of wire fabric terminating in the side walls in spaced relation to the beads.

In testimony whereof I affix my signature.

WILLIAM O. WETMORE.